US012754644B2

(12) United States Patent
Kang et al.

(10) Patent No.: US 12,754,644 B2
(45) Date of Patent: Oct. 6, 2026

(54) ELECTRONIC DEVICE

(71) Applicant: Samsung Display Co., Ltd., Yongin-si (KR)

(72) Inventors: Bongil Kang, Yongin-si (KR); Min-Hong Kim, Yongin-si (KR); Sangkook Kim, Yongin-si (KR); Taejoon Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/019,085

(22) Filed: Jan. 13, 2025

(65) Prior Publication Data

US 2025/0271973 A1 Aug. 28, 2025

(30) Foreign Application Priority Data

Feb. 26, 2024 (KR) ........................ 10-2024-0027186

(51) Int. Cl.
*G06F 3/044* (2006.01)

(52) U.S. Cl.
CPC .......... *G06F 3/0446* (2019.05); *G06F 3/0448* (2019.05); *G06F 2203/04111* (2013.01)

(58) Field of Classification Search
CPC ................. G06F 3/0446; G06F 3/0448; G06F 2203/04111
See application file for complete search history.

(56) References Cited

U.S. PATENT DOCUMENTS

| | | | | |
|---|---|---|---|---|
| 11,586,328 | B1 * | 2/2023 | Lin | G06F 3/0448 |
| 2018/0011596 | A1 * | 1/2018 | Korapati | G06F 3/04186 |
| 2020/0034595 | A1 | 1/2020 | Jang et al. | |
| 2021/0173518 | A1 * | 6/2021 | Moon | G06F 3/04164 |

FOREIGN PATENT DOCUMENTS

| | | | |
|---|---|---|---|
| CN | 109782953 | A | 5/2019 |
| KR | 10-2018-0026597 | A | 3/2018 |

* cited by examiner

*Primary Examiner* — Amit Chatly
(74) *Attorney, Agent, or Firm* — Womble Bond Dickinson (US) LLP

(57) ABSTRACT

Disclosed is an electronic device which includes a display layer, a sensor layer above the display layer, and a sensor driver configured to drive the sensor layer in a first mode when a mutual capacitance of a node of the sensor layer compared to a mutual capacitance of another node that is adjacent to the node is outside a ratio range, wherein the sensor layer includes a first electrode including sensing patterns and a bridge pattern, a second electrode including first parts and a second part, and a dummy electrode including dummy patterns, wherein a first area of one of the dummy patterns is less than a second area of one of the first parts, and wherein a ratio of the first area to the second area satisfies the ratio range.

20 Claims, 11 Drawing Sheets

ELECTRONIC DEVICE

CROSS-REFERENCE TO RELATED APPLICATION

The present application claims priority to, and the benefit of, Korean Patent Application No. 10-2024-0027186, filed on Feb. 26, 2024, in the Korean Intellectual Property Office, the entire disclosure of which is incorporated herein by reference.

BACKGROUND

1. Field

Embodiments of the present disclosure described herein relate to an electronic device with improved reliability.

2. Description of the Related Art

An electronic device may include a display layer that displays an image, and a sensor layer that senses an external input. The sensor layer may be integrally formed with the display layer through a continuous process. Alternatively, the sensor layer may be formed separately from the display layer, and thereafter may be coupled to the display layer.

SUMMARY

Embodiments of the present disclosure provide an electronic device with improved reliability.

According to one or more embodiments, an electronic device includes a display layer, a sensor layer above the display layer, and a sensor driver configured to drive the sensor layer in a first mode when a mutual capacitance of a node of the sensor layer compared to a mutual capacitance of another node that is adjacent to the node is outside a ratio range, wherein the sensor layer includes a first electrode including sensing patterns and a bridge pattern, a second electrode including first parts and a second part, and a dummy electrode including dummy patterns, wherein a first area of one of the dummy patterns is less than a second area of one of the first parts, and wherein a ratio of the first area to the second area satisfies the ratio range.

The ratio range may range from about 1% to about 10%.

The first electrode may extend in a first direction, wherein the second electrode extends in a second direction crossing the first direction, and wherein the first electrode and the second electrode are insulated from each other, and cross each other.

The dummy patterns may be between a first part of the first parts and a sensing pattern of the sensing patterns.

The dummy patterns may be electrically insulated from each other.

A first part of the first parts, the second part, and a sensing pattern of the sensing patterns may be at a same layer.

The bridge pattern may include an island pattern adjacent to the second part, and a connecting pattern connected between the sensing pattern and the island pattern, and at a layer that is different from a layer of the sensing pattern and the island pattern.

A first capacitor having a first capacitance may be defined between the first electrode and the second electrode, wherein the second electrode and one of the dummy patterns are electrically connected, wherein a second capacitor having a second capacitance is defined between the first electrode, and the second electrode and the one of the dummy patterns, and wherein the second capacitance has an increase rate of about 1% to about 10% when compared to the first capacitance.

The dummy patterns may include a first dummy pattern and a second dummy pattern having different respective areas.

The dummy patterns may include a first dummy pattern and a second dummy pattern having different respective shapes.

The dummy patterns may include a first dummy pattern, a second dummy pattern, and a third dummy pattern, wherein a width of a gap between the first dummy pattern and the second dummy pattern is different from a width of a gap between the second dummy pattern and the third dummy pattern.

According to one or more embodiments, an electronic device includes a display layer, and a sensor layer above the display layer, and including a first electrode including sensing patterns and a bridge pattern, a second electrode including first parts and a second part, and a dummy electrode including dummy patterns, and wherein a first area of one of the dummy patterns ranges from about 1% to about 10% of a second area of one of the first parts.

The first electrode may extend in a first direction, wherein the second electrode extends in a second direction crossing the first direction, and wherein the first electrode and the second electrode are insulated from each other, and cross each other.

The dummy patterns may be between a first part of the first parts and a sensing pattern of the sensing patterns.

The dummy patterns may be electrically insulated from each other.

A first part of the first parts, the second part, and a sensing pattern of the sensing patterns may be at a same layer.

The bridge pattern may include an island pattern adjacent to the second part, and a connecting pattern connected between the sensing pattern and the island pattern, and at a layer that is different from a layer of the sensing pattern and the island pattern.

A first capacitor having a first capacitance may be defined between the first electrode and the second electrode, wherein the second electrode and one of the dummy patterns are electrically connected, wherein a second capacitor having a second capacitance is defined between the first electrode, and the second electrode and the one of the dummy patterns, and wherein the second capacitance has an increase rate of about 1% to about 10% when compared to the first capacitance.

The dummy patterns may include a first dummy pattern and a second dummy pattern having different respective shapes.

The dummy patterns may include a first dummy pattern and a second dummy pattern having different respective areas.

BRIEF DESCRIPTION OF THE DRAWINGS

The above and other aspects of the present disclosure will become apparent by describing in detail embodiments thereof with reference to the accompanying drawings.

DETAILED DESCRIPTION

Figure 1:
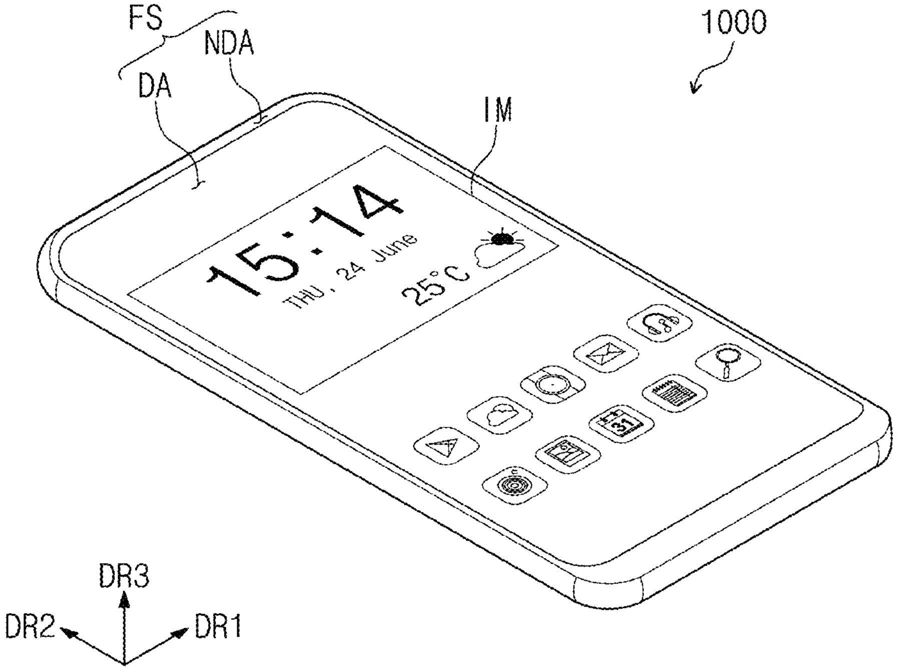
FIG. 1 is a perspective view of an electronic device according to one or more embodiments of the present disclosure.

Aspects of some embodiments of the present disclosure and methods of accomplishing the same may be understood more readily by reference to the detailed description of embodiments and the accompanying drawings. The described embodiments are provided as examples so that this disclosure will be thorough and complete, and will fully convey the aspects of the present disclosure to those skilled in the art. Accordingly, processes, elements, and techniques that are redundant, that are unrelated or irrelevant to the description of the embodiments, or that are not necessary to those having ordinary skill in the art for a complete understanding of the aspects of the present disclosure may be omitted. Unless otherwise noted, like reference numerals, characters, or combinations thereof denote like elements throughout the attached drawings and the written description, and thus, repeated descriptions thereof may be omitted.

The described embodiments may have various modifications and may be embodied in different forms, and should not be construed as being limited to only the illustrated embodiments herein. The use of "can," "may," or "may not" in describing an embodiment corresponds to one or more embodiments of the present disclosure.

A person of ordinary skill in the art would appreciate, in view of the present disclosure in its entirety, that each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner unless otherwise stated or implied.

In the drawings, the relative sizes of elements, layers, and regions may be exaggerated for clarity and/or descriptive purposes. In other words, because the sizes and thicknesses of elements in the drawings are arbitrarily illustrated for convenience of description, the disclosure is not limited thereto. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result of, for example, manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the illustrated shapes of elements, layers, or regions, but are to include deviations in shapes that result from, for instance, manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place.

Spatially relative terms, such as "beneath," "below," "lower," "lower side," "under," "above," "upper," "over," "higher," "upper side," "side" (e.g., as in "sidewall"), and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below," "beneath," "or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, the phrase "in a plan view" means when an object portion is viewed from above, and the phrase "in a schematic cross-sectional view" means when a schematic cross-section taken by vertically cutting an object portion is viewed from the side. The terms "overlap" or "overlapped" mean that a first object may be above or below or to a side of a second object, and vice versa. Additionally, the term "overlap" may include stack, face or facing, extending over, covering, or partly covering or any other suitable term as would be appreciated and understood by those of ordinary skill in the art. The expression "not overlap" may include meaning, such as "apart from" or "set aside from" or "offset from" and any other suitable equivalents as would be appreciated and understood by those of ordinary skill in the art. The terms "face" and "facing" may mean that a first object may directly or indirectly oppose a second object. In a case in which a third object intervenes between a first and second object, the first and second objects may be understood as being indirectly opposed to one another, although still facing each other.

It will be understood that when an element, layer, region, or component is referred to as being "formed on," "on," "connected to," or "(operatively or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or one or more intervening layers, regions, or components may be present. The one or more intervening components may include a switch, a resistor, a capacitor, and/or the like. In describing embodiments, an expression of connection indicates electrical connection unless explicitly described to be direct connection, and "directly connected/directly coupled," or "directly on," refers to one component directly connecting or coupling another component, or being on another component, without an intermediate component.

In addition, in the present specification, when a portion of a layer, a film, an area, a plate, or the like is formed on another portion, a forming direction is not limited to an upper direction but includes forming the portion on a side surface or in a lower direction. On the contrary, when a portion of a layer, a film, an area, a plate, or the like is formed "under" another portion, this includes not only a case where the portion is "directly beneath" another portion but also a case where there is further another portion between the portion and another portion. Meanwhile, other expressions describing relationships between components, such as "between," "immediately between" or "adjacent to" and "directly adjacent to," may be construed similarly. It will be understood that when an element or layer is referred to as being "between" two elements or layers, it can be the only element or layer between the two elements or layers, or one or more intervening elements or layers may also be present.

For the purposes of this disclosure, expressions such as "at least one of," or "any one of," or "one or more of" when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XYY, YZ, and ZZ, or any variation thereof. Similarly, the expressions "at least one of A and B" and "at least one of A or B" may include A, B, or A and B. As used herein, "or" generally means "and/or," and the term "and/or" includes any and all combinations of one or more of the associated listed items. For example, the expression "A and/or B" may include A, B, or A and B. Similarly, expressions such as "at least one of," "a plurality of," "one of," and other prepositional phrases, when preceding a list of elements, modify the entire list of elements and do not modify the individual elements of the list. When "C to D" is stated, it means C or more and D or less, unless otherwise specified.

It will be understood that, although the terms "first," "second," "third," etc., may be used herein to describe various elements, components, regions, layers and/or sections, these elements, components, regions, layers and/or sections should not be limited by these terms. These terms do not correspond to a particular order, position, or superiority, and are used only used to distinguish one element, member, component, region, area, layer, section, or portion from another element, member, component, region, area, layer, section, or portion. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the terms "substantially," "about," "approximately," and similar terms are used as terms of approximation and not as terms of degree, and are intended to account for the inherent deviations in measured or calculated values that would be recognized by those of ordinary skill in the art. For example, "substantially" may include a range of +/−5% of a corresponding value. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

In some embodiments well-known structures and devices may be described in the accompanying drawings in relation to one or more functional blocks (e.g., block diagrams), units, and/or modules to avoid unnecessarily obscuring various embodiments. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the present disclosure. In addition, in some embodiments, the block, unit and/or module may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a perspective view of an electronic device according to one or more embodiments of the present disclosure.

Referring to FIG. 1, the electronic device 1000 may be a device activated depending on an electrical signal. For example, the electronic device 1000 may be a mobile phone, a foldable mobile phone, a notebook computer, a television, a tablet computer, a car navigation unit, a game machine, or a wearable device, but is not limited thereto. In FIG. 1, the electronic device 1000 is illustrated as a mobile phone.

A display surface FS parallel in a first direction DR1, and in a second direction DR2 crossing the first direction DR1, may be defined on the electronic device 1000. The display FS may include an active area DA and a peripheral area NDA. The electronic device 1000 may display an image IM through the active area DA. The peripheral area NDA may surround the periphery of the active area DA (e.g., in plan view).

The thickness direction of the electronic device 1000 may be parallel to a third direction DR3 that crosses the first direction DR1 and the second direction DR2. Accordingly, front surfaces (or, upper surfaces) and rear surfaces (or, lower surfaces) of members constituting the electronic device 1000 may be defined based on the third direction DR3.

Figure 2:
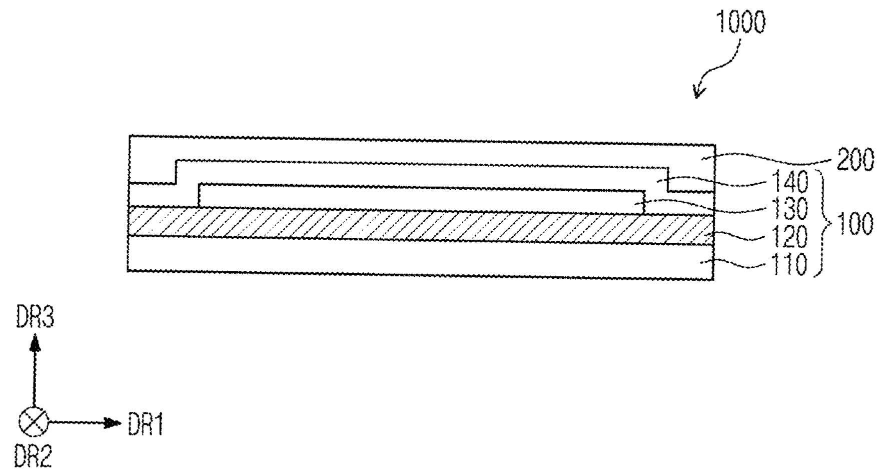
FIG. 2 is a schematic sectional view of a display panel according to one or more embodiments of the present disclosure.

FIG. 2 is a schematic sectional view of a display panel according to one or more embodiments of the present disclosure.

Referring to FIG. 2, the electronic device 1000 may include a display layer 100 and a sensor layer 200.

The display layer 100 may be a component that substantially generates the image IM (refer to FIG. 1). The display layer 100 may be an emissive display layer, but is not particularly limited. For example, the display layer 100 may include an organic light-emitting display layer, a quantum-dot display layer, a micro-LED display layer, or a nano-LED display layer. An emissive layer of the organic light-emitting display layer may include an organic luminescent material. An emissive layer of the quantum-dot display layer may include quantum dots and quantum rods. An emissive layer of the micro-LED display layer may include a micro-LED. An emissive layer of the nano-LED display layer may include a nano-LED.

The display layer 100 may include a base layer 110, a circuit layer 120, a light-emitting element layer 130, and an encapsulation layer 140.

The base layer 110 may be a member that provides a base surface on which the circuit layer 120 is located. The base layer 110 may have a multi-layer structure or a single-layer structure. The base layer 110 may be a glass substrate, a metal substrate, a silicon substrate, or a polymer substrate, but is not particularly limited thereto.

The circuit layer 120 may be located on the base layer 110. The circuit layer 120 may include an insulating layer, a semiconductor pattern, a conductive pattern, and a signal line. An insulating layer, a semiconductor layer, and a conductive layer may be formed on the base layer 110 by a process, such as coating or deposition, and may be selectively subjected to patterning by performing a photolithography process a plurality of times.

The light-emitting element layer 130 may be located on the circuit layer 120. The light-emitting element layer 130 may include light-emitting elements. For example, the light-emitting element layer 130 may include an organic luminescent material, an inorganic luminescent material, an organic-inorganic luminescent material, a quantum dot, a quantum rod, a micro LED, or a nano LED.

The encapsulation layer 140 may be located on the light-emitting element layer 130. The encapsulation layer 140 may protect the light-emitting element layer 130 from foreign matter, such as moisture, oxygen, and dust particles.

The sensor layer 200 may be located on the display layer 100. The sensor layer 200 may sense an external input applied from the outside. The sensor layer 200 may be an integrated sensor continuously formed in a process of manufacturing the display layer 100. Alternatively, the sensor layer 200 may be an external sensor attached to the display layer 100. The sensor layer 200 may be referred to as a sensor, an input-sensing layer, an input-sensing panel, or an electronic device for sensing input coordinates.

According to one or more embodiments of the present disclosure, the sensor layer 200 may sense both an input by a passive input means, such as a part of a user's body and an input by an input device that generates a magnetic field having a resonant frequency (e.g., predetermined resonant frequency).

Figure 3:
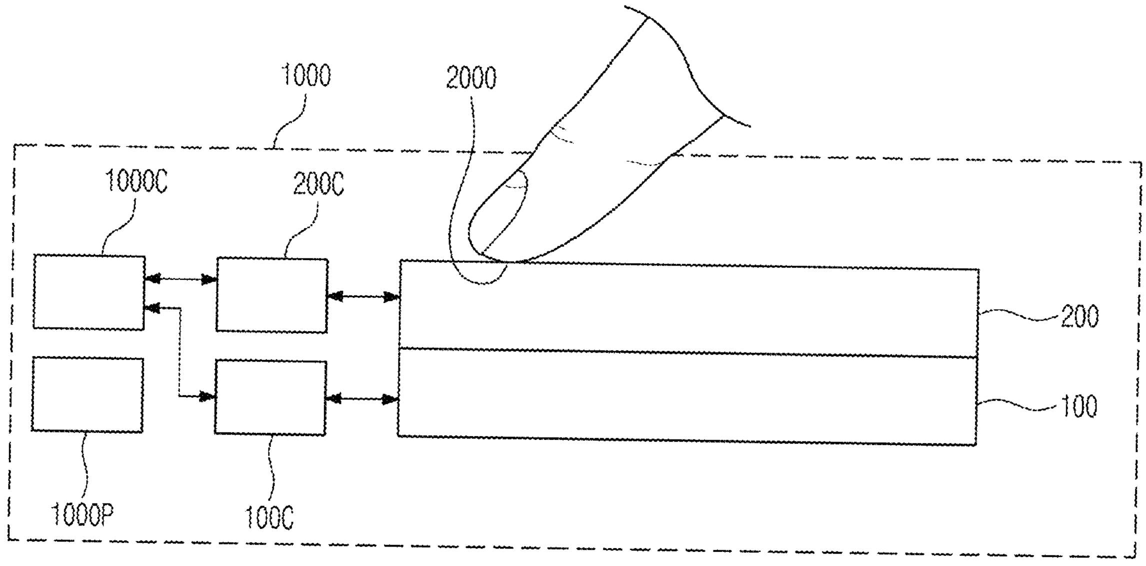
FIG. 3 is a block diagram for explaining an operation of the electronic device according to one or more embodiments of the present disclosure.

FIG. 3 is a block diagram for explaining an operation of the electronic device according to one or more embodiments of the present disclosure.

Referring to FIG. 3, the electronic device 1000 may include the display layer 100, the sensor layer 200, a display driver 100C, a sensor driver 200C, a main driver 1000C, and a power circuit 1000P.

The sensor layer 200 may sense a first input 2000 applied from the outside (e.g., an externally applied first input 2000). The first input 2000 may be of an input means capable of causing a change in the capacitance of the sensor layer 200. For example, the first input 2000 may be of a passive input means, such as a part of the user's body.

The main driver 1000C may control overall operation of the electronic device 1000. For example, the main driver 1000C may control operations of the display driver 100C and the sensor driver 200C. The main driver 1000C may include at least one microprocessor, and may further include a graphic controller. The main driver 1000C may be referred to as an application processor, a central processing unit, or a main processor.

The display driver 100C may drive the display layer 100. The display driver 100C may receive image data and a control signal from the main driver 1000C. The control signal may include various signals. For example, the control signal may include an input vertical synchronization signal, an input horizontal synchronization signal, a main clock, and a data enable signal.

The sensor driver 200C may drive the sensor layer 200. The sensor driver 200C may receive a control signal from the main driver 1000C. The control signal may include a clock signal of the sensor driver 200C. In addition, the control signal may further include a mode determination signal for determining a driving mode of the sensor driver 200C and the sensor layer 200.

The sensor driver 200C may be implemented with an integrated circuit (IC), and may be electrically connected with the sensor layer 200. For example, the sensor driver 200C may be directly mounted on an area (e.g., predetermined area) of the display panel. Alternatively, the sensor driver 200C may be mounted on a separate printed circuit board using a chip-on-film (COF) method, and may be electrically connected with the sensor layer 200.

The sensor driver 200C may calculate coordinate information of an input based on a signal received from the sensor layer 200, and may provide a coordinate signal having the coordinate information to the main driver 1000C. The main driver 1000C executes an operation corresponding to a user input, based on the coordinate signal. For example, the main driver 1000C may operate the display driver 100C, such that a new application image is displayed on the display layer 100.

The sensor driver 200C may operate in a first mode, or in a second mode different from the first mode.

The sensor driver 200C may drive the sensor layer 200 in the first mode. In the first mode, the sensor driver 200C may calculate the coordinate information of the first input 2000, based on the mutual capacitance between a first electrode TE1 (refer to FIG. 6) and a second electrode TE2 (refer to FIG. 6) of the sensor layer 200. The first mode may be referred to as a normal mode.

When a plurality of first inputs 2000 are provided in the first mode, the sensor layer 200 may sense at least three first inputs 2000.

When the mutual capacitance of a corresponding node of the sensor layer 200 is outside a ratio range (e.g., predetermined ratio range) when compared to that of another node adjacent to the corresponding node, the sensor driver 200C may operate in the second mode. For example, the ratio range (e.g., predetermined ratio range) may refer to a range of about 10% or less. When the mutual capacitance increases by more than about 10%, the mutual capacitance may increase by about 0.1 picofarad (pF) or more. The sensor driver 200C may determine that the surface of the electronic device 1000 is wet. The second mode may be referred to as a wet mode.

When a plurality of first inputs 2000 are provided in the second mode, the sensor layer 200 may sense two or fewer first inputs 2000. That is, the number of detectable first inputs 2000 in the second mode may be less than the number of detectable first inputs 2000 in the first mode.

When the surface of the electronic device 1000 is wet, the sensor driver 200C may operate in the second mode, and may easily sense the coordinates of the first input 2000 in consideration of an increase in mutual capacitance.

The power circuit 1000P may include a power management integrated circuit (PMIC). The power circuit 1000P may generate a plurality of driving voltages for driving the display layer 100, the sensor layer 200, the display driver 100C, and the sensor driver 200C. For example, the plurality of driving voltages may include a gate high-voltage, a gate low-voltage, a first driving voltage (e.g., an ELVSS voltage), a second driving voltage (e.g., an ELVDD voltage), an initialization voltage, and the like, but are not particularly limited to the examples.

Figure 4:
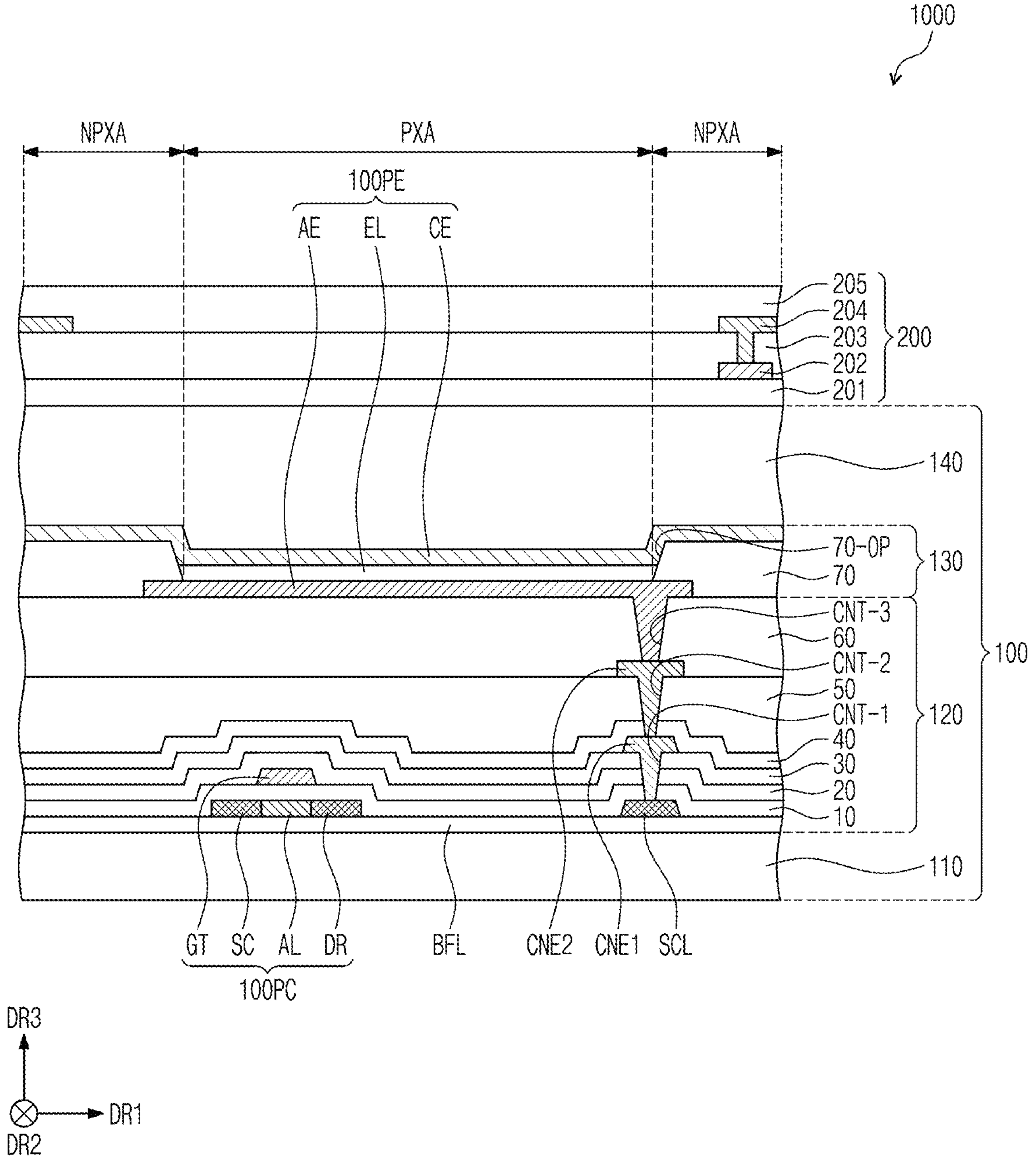
FIG. 4 is a sectional view of the display panel according to one or more embodiments of the present disclosure.

FIG. 4 is a sectional view of the display panel according to one or more embodiments of the present disclosure. In describing FIG. 4, the components described with reference to FIG. 2 will be assigned with the identical reference numerals, and descriptions thereabout will be omitted.

Referring to FIG. 4, at least one buffer layer BFL is formed on the upper surface of the base layer 110. The buffer layer BFL may improve the coupling force between the base layer 110 and a semiconductor pattern. The buffer layer BFL may be formed of multiple layers. Alternatively, the display layer 100 may further include a barrier layer. The buffer layer BFL may include at least one of silicon oxide, silicon nitride, or silicon oxy nitride. For example, the buffer layer BFL may include a structure in which silicon oxide layers and silicon nitride layers are alternately stacked one above another.

The semiconductor pattern SC, AL, DR, and SCL may be located on the buffer layer BFL. The semiconductor pattern SC, AL, DR, and SCL may include polysilicon. However, without being limited thereto, the semiconductor pattern SC, AL, DR, and SCL may include amorphous silicon, low-temperature polycrystalline silicon, or oxide semiconductor.

FIG. 4 illustrates only a portion of the semiconductor pattern SC, AL, DR, and SCL, and the semiconductor pattern may be additionally located in other areas. The semiconductor pattern SC, AL, DR, and SCL may be arranged over pixels according to a corresponding rule. The semiconductor pattern SC, AL, DR, and SCL may have different electrical properties depending on whether doping is performed or not. The semiconductor pattern SC, AL, DR, and SCL may include first areas SC, DR, and SCL having a high conductivity, and a second area AL having a low conductivity. The first areas SC, DR, and SCL may be doped with an N-type dopant or a P-type dopant. A P-type transistor may include a doped area that is doped with a P-type dopant, and an N-type transistor may include a doped area that is doped with an N-type dopant. The second area AL may be a non-doped area or may be an area more lightly doped than the first areas.

The first areas SC, DR, and SCL may have a higher conductivity than the second area AL, and may substantially serve as electrodes or signal lines. The second area AL may substantially correspond to an active area AL (or, a channel) of a transistor 100PC. In other words, one portion AL of the semiconductor pattern SC, AL, DR, and SCL may be the active area AL of the transistor 100PC, another portion SC or DR of the semiconductor pattern SC, AL, DR, and SCL may be a source area SC or a drain area DR of the transistor 100PC, and the other portion SCL of the semiconductor pattern SC, AL, DR, and SCL may be a connecting electrode or a connecting signal line SCL.

Each of the pixels may have an equivalent circuit including seven transistors, one capacitor, and a light-emitting element, and the equivalent circuit of the pixel may be modified in various forms. In FIG. 4, one transistor 100PC and one light-emitting element 100PE included in the pixel are illustrated as an example.

The source area SC, the active area AL, and the drain area DR of the transistor 100PC may be formed from the semiconductor pattern SC, AL, DR, and SCL. The source area SC and the drain area DR may extend from the active area AL in opposite directions on the section. In FIG. 4, a portion of the connecting signal line SCL formed from the semiconductor pattern SC, AL, DR, and SCL is illustrated. In one or more embodiments, the connecting signal line SCL may be connected to the drain area DR of the transistor 100PC when viewed from above the plane.

A first insulating layer 10 may be located on the buffer layer BFL. The first insulating layer 10 may commonly overlap the plurality of pixels, and may cover the semiconductor pattern SC, AL, DR, and SCL. The first insulating layer 10 may be an inorganic layer and/or an organic layer, and may have a single-layer structure or a multi-layer structure. The first insulating layer 10 may include at least one of aluminum oxide, titanium oxide, silicon oxide, silicon nitride, silicon oxy nitride, zirconium oxide, or hafnium oxide. The first insulating layer 10 may be a single silicon oxide layer. Not only the first insulating layer 10, but also insulating layers of the circuit layer 120 that will be described below, may be inorganic layers and/or organic layers, and may have a single-layer structure or a multi-layer structure. The inorganic layers may include at least one of the aforementioned materials, but are not limited thereto.

A gate GT of the transistor 100PC is located on the first insulating layer 10. The gate GT may be a portion of a metal pattern. The gate GT overlaps the active area AL. The gate GT may function as a mask in a process of doping or reducing the semiconductor pattern SC, AL, DR, and SCL.

A second insulating layer 20 may be located on the first insulating layer 10, and may cover the gate GT. The second insulating layer 20 may commonly overlap the pixels. The second insulating layer 20 may be an inorganic layer and/or an organic layer, and may have a single-layer structure or a multi-layer structure. The second insulating layer 20 may include at least one of silicon oxide, silicon nitride, or silicon oxy nitride. The second insulating layer 20 may have a multi-layer structure including a silicon oxide layer and a silicon nitride layer.

A third insulating layer 30 may be located on the second insulating layer 20. The third insulating layer 30 may have a single-layer structure or a multi-layer structure. For example, the third insulating layer 30 may have a multi-layer structure including a silicon oxide layer and a silicon nitride layer.

A first connecting electrode CNE1 may be located on the third insulating layer 30. The first connecting electrode CNE1 may be connected to the connecting signal line SCL through a contact hole CNT-1 penetrating the first, second, and third insulating layers 10, 20, and 30.

A fourth insulating layer 40 may be located on the third insulating layer 30. The fourth insulating layer 40 may be a single silicon oxide layer. A fifth insulating layer 50 may be located on the fourth insulating layer 40. The fifth insulating layer 50 may be an organic layer.

A second connecting electrode CNE2 may be located on the fifth insulating layer 50. The second connecting electrode CNE2 may be connected to the first connecting electrode CNE1 through a contact hole CNT-2 penetrating the fourth insulating layer 40 and the fifth insulating layer 50.

A sixth insulating layer 60 may be located on the fifth insulating layer 50, and may cover the second connecting electrode CNE2. The sixth insulating layer 60 may be an organic layer.

The light-emitting element layer 130 may be located on the circuit layer 120. The light-emitting element layer 130 may include the light-emitting element 100PE. For example, the light-emitting element layer 130 may include an organic luminescent material, an inorganic luminescent material, an organic-inorganic luminescent material, a quantum dot, a quantum rod, a micro LED, or a nano LED. Hereinafter, the light-emitting element 100PE is an organic light-emitting element, as an example. However, the present disclosure is not particularly limited thereto.

The light-emitting element 100PE may include an anode electrode AE, an emissive layer EL, and a cathode electrode CE.

The anode electrode AE may be located on the sixth insulating layer 60. The anode electrode AE may be connected to the second connecting electrode CNE2 through a contact hole CNT-3 penetrating the sixth insulating layer 60.

A pixel-defining layer 70 may be located on the sixth insulating layer 60 and may cover a portion of the anode electrode AE. The pixel-defining layer 70 has an opening 70-OP defined therein. The opening 70-OP of the pixel-defining layer 70 exposes at least a portion of the anode electrode AE.

The active area DA (refer to FIG. 2) may include an emissive area PXA, and a non-emissive area NPXA adjacent to the emissive area PXA. The non-emissive area NPXA may surround the emissive area PXA (e.g., in plan view). The emissive area PXA is defined to correspond to a partial area of the anode electrode AE exposed by the opening 70-OP.

The emissive layer EL may be located on the anode electrode AE. The emissive layer EL may be located in an area corresponding to the opening 70-OP. That is, the emissive layer EL may be separately formed for each of the pixels. When the emissive layer EL is separately formed for each of the pixels, the emissive layers EL may each emit at least one of blue light, red light, or green light. However, without being limited thereto, the emissive layer EL may be connected to the pixels, and may be commonly included in the pixels. In this case, the emissive layer EL may provide blue light or white light.

The cathode electrode CE may be located on the emissive layer EL. The cathode electrode CE may have a one-body shape, and may be commonly included in the plurality of pixels.

In one or more embodiments of the present disclosure, a hole control layer may be located between the anode electrode AE and the emissive layer EL. The hole control layer may be commonly located in the emissive area PXA and the non-emissive area NPXA. The hole control layer may include a hole transport layer, and may further include a hole injection layer. An electron control layer may be located between the emissive layer EL and the cathode electrode CE. The electron control layer may include an electron transport layer, and may further include an electron injection layer. The hole control layer and the electron control layer may be commonly formed in the plurality of pixels using an open mask or an ink-jet process.

The encapsulation layer 140 may be located on the light-emitting element layer 130. The encapsulation layer 140 may include an inorganic layer, an organic layer, and an inorganic layer that are sequentially stacked one above another. However, layers constituting the encapsulation layer 140 are not limited thereto. The inorganic layers may protect the light-emitting element layer 130 from moisture and oxygen, and the organic layer may protect the light-emitting element layer 130 from foreign matter, such as dust particles. The inorganic layers may include a silicon nitride layer, a silicon oxy nitride layer, a silicon oxide layer, a titanium oxide layer, or an aluminum oxide layer. The organic layer may include an acrylic organic layer, but is not limited thereto.

The sensor layer 200 may include a base layer 201, a first conductive layer 202, a sensing insulation layer 203, a second conductive layer 204, and a cover insulating layer 205.

The base layer 201 may be an inorganic layer including at least one of silicon nitride, silicon oxy nitride, or silicon oxide. Alternatively, the base layer 201 may be an organic layer including an epoxy resin, an acrylic resin, or an imide-based resin. The base layer 201 may have a single-layer structure, or may have a multi-layer structure stacked in the third direction DR3.

Each of the first conductive layer 202 and the second conductive layer 204 may have a single-layer structure, or may have a multi-layer structure stacked in the third direction DR3.

Each of the first conductive layer 202 and the second conductive layer 204 that have a single-layer structure may include a metal layer or a transparent conductive layer. The term "transparent" used herein may mean that light transmittance is greater than or equal to a reference value (e.g., predetermined reference value). For example, the reference value may be about 90%. However, the present disclosure is not limited thereto. The metal layer may include molybdenum, silver, titanium, copper, aluminum, or an alloy thereof. The transparent conductive layer may include transparent conductive oxide, such as indium tin oxide (ITO), indium zinc oxide (IZO), zinc oxide (ZnO), indium zinc tin oxide (IZTO), or the like. In addition, the transparent conductive layer may include a conductive polymer, such as poly(3,4-ethylenedioxythiophene) (PEDOT), a metal nano wire, or graphene.

Each of the first conductive layer 202 and the second conductive layer 204 that have a multi-layer structure may include metal layers. The meal layers may have, for example, a three-layer structure of titanium/aluminum/titanium. The conductive layer having the multi-layer structure may include at least one metal layer and/or at least one transparent conductive layer.

At least one of the sensing insulation layer 203 or the cover insulating layer 205 may include an inorganic film. The inorganic film may include at least one of aluminum oxide, titanium oxide, silicon oxide, silicon nitride, silicon oxy nitride, zirconium oxide, or hafnium oxide.

At least one of the sensing insulation layer 203 or the cover insulating layer 205 may include an organic film. The organic film may include at least one of an acrylic resin, a methacrylic resin, a polyisoprene resin, a vinyl resin, an epoxy resin, a urethane-based resin, a cellulosic resin, a siloxane-based resin, a polyimide resin, a polyamide resin, or a perylene-based resin.

Figure 5:
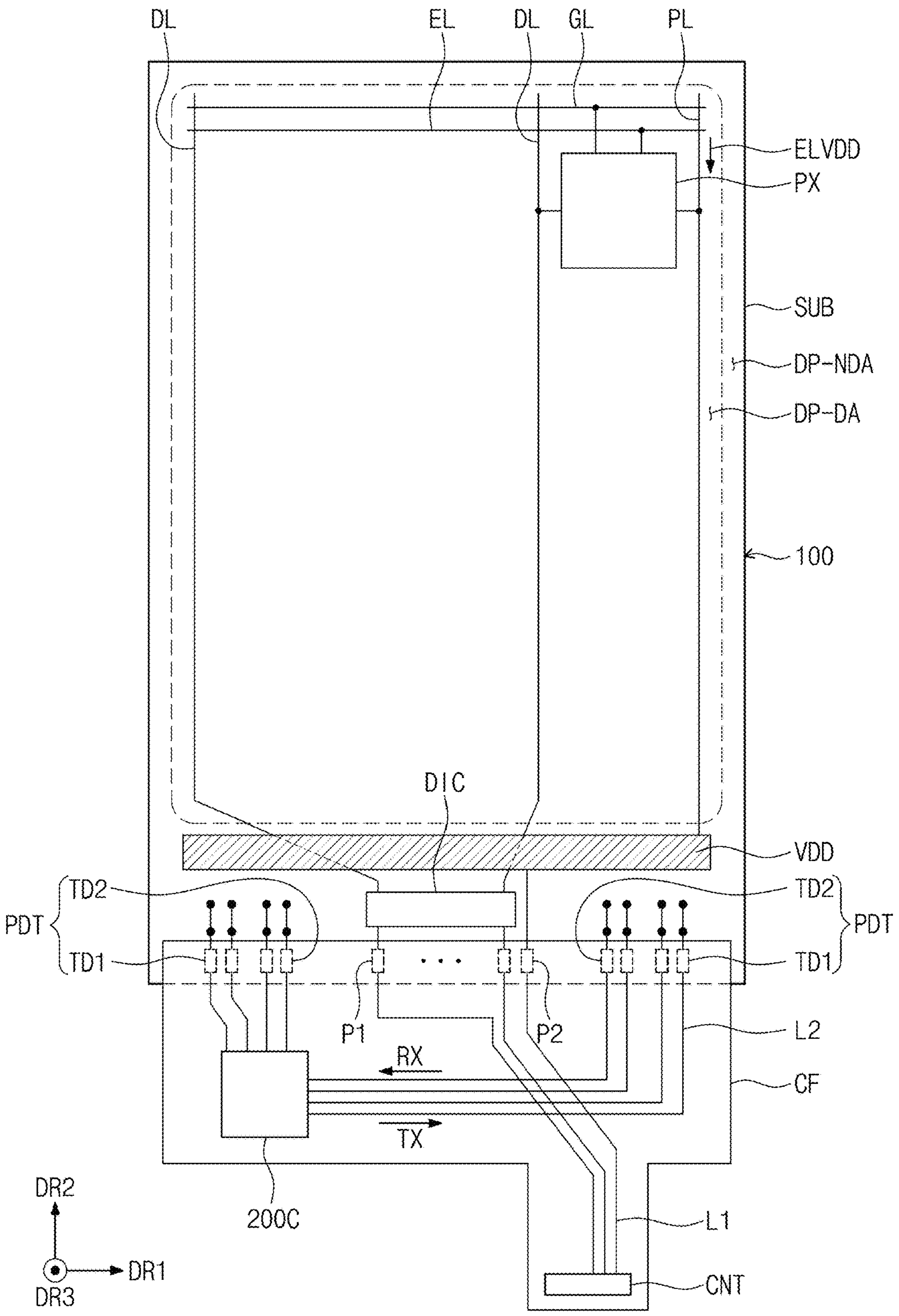
FIG. 5 is a plan view illustrating a display layer and a circuit board according to one or more embodiments of the present disclosure.

FIG. 5 is a plan view illustrating the display layer and a circuit board according to one or more embodiments of the present disclosure.

Referring to FIG. 5, the electronic device 1000 (refer to FIG. 1) may include the display layer 100, a power pattern VDD, a data driver DIC, the circuit board CF, the sensor driver 200C, and a connector CNT.

A display area DP-DA, and a peripheral area DP-NDA adjacent to the display area DP-DA, may be defined in the display layer 100. The display area DP-DA may be an area on which an image is displayed. A plurality of pixels PX may be located in the display area DP-DA. The peripheral area DP-NDA may be an area in which a driving circuit or a driving line is located.

The display layer 100 may include a base layer SUB, the plurality of pixels PX, a plurality of signal lines GL, DL, PL, and EL, a plurality of display pads P1 and P2, and a plurality of sensing pads PDT.

Each of the plurality of pixels PX may display one of primary colors or one of mixed colors. The primary colors may include red, green, and blue. The mixed colors may include various colors, such as white, yellow, cyan, and magenta. However, colors displayed by the pixels PX, respectively, are not limited thereto.

The plurality of signal lines GL, DL, PL, and EL may be located on the base layer SUB. The plurality of signal lines GL, DL, PL, and EL may be connected to the plurality of pixels PX, and may transfer electrical signals to the plurality of pixels PX. The plurality of signal lines GL, DL, PL, and EL may include a plurality of scan lines GL, a plurality of data lines DL, a plurality of power lines PL, and a plurality of light emission control lines EL. However, this is illustrative, and a configuration of the plurality of signal lines GL, DL, PL, and EL according to one or more embodiments of the present disclosure is not limited thereto. For example, the plurality of signal lines GL, DL, PL, and EL according to one or more embodiments of the present disclosure may further include an initialization voltage line.

The power pattern VDD may be located in the peripheral area DP-NDA. The power pattern VDD may be connected with the plurality of power lines PL. Each of the plurality of pixels PX may receive the second driving voltage ELVDD provided by the power line PL.

The plurality of display pads P1 and P2 may be located in the peripheral area DP-NDA. The plurality of display pads P1 and P2 may include the first pad P1 and the second pad P2. The first pad P1 may be provided in plural. The plurality of first pads P1 may be connected to the plurality of data lines DL, respectively. The second pad P2 may be connected to the power pattern VDD, and may be electrically connected with the plurality of power lines PL. The display layer 100 may provide, to the plurality of pixels PX, electrical signals provided from the outside through the plurality of display pads P1 and P2. Meanwhile, the plurality of display pads P1 and P2 may further include pads for receiving other electrical signals, in addition to the first pad P1 and the second pad P2, and are not limited to any one embodiment.

The data driver DIC may be mounted on the peripheral area DP-NDA. The data driver DIC may be a timing control circuit in the form of a chip. The data driver DIC may output a gray voltage to the plurality of data lines DL in response to frame data of image data. The plurality of data lines DL may be electrically connected to the plurality of first pads PD1, respectively, through the data driver DIC. However, this is merely illustrative, and the data driver DIC according to one or more embodiments of the present disclosure may be mounted on a film separate from the display layer 100. The data driver DIC may be electrically connected with the plurality of display pads P1 and P2 through the film.

The plurality of sensing pads PDT may be located in the peripheral area DP-NDA. The plurality of sensing pads PDT may be electrically connected with a plurality of sensing electrodes of the sensor layer 200, respectively. The plurality of sensing pads PDT may include a plurality of first sensing pads TD1 and a plurality of second sensing pads TD2.

The circuit board CF may be electrically connected with the plurality of display pads P1 and P2 and the plurality of sensing pads PDT.

The sensor driver 200*c* may be mounted on the circuit board CF. The sensor driver 200C may be electrically connected with the plurality of sensing pads PDT. The sensor driver 200C may drive the sensor layer 200 (refer to FIG. 2).

A first line L1 may be electrically connected with the data driver DIC. For example, the first line L1 may be connected between the plurality of display pads P1 and P2 and the connector CNT. The first line L1 may transmit and receive a data signal DATA. The data signal DATA may be referred to as an MIPI signal. The first line L1 may be located on the circuit board CF. The first line L1 may be referred to as an MIPI line.

A second line L2 may be electrically connected between the sensor layer 200 and the sensor driver 200C. For example, the second line L2 may be connected between the plurality of sensing pads PDT and the sensor driver 200C. A touch transmission signal TX and a touch reception signal RX may be provided through the second line L2. The second line L2 may be located on the circuit board CF.

The connector CNT may be electrically connected with the first line L1 and the second line L2. The connector CNT may be located on the circuit board CF. The connector CNT may be connected to a host processor.

The host processor may include at least one of a central processing unit (CPU) or an application processor. The host processor may further include at least one of a graphic processing unit (GPU), a communication processor (CP), or an image signal processor (ISP). The host processor may further include a neural processing unit (NPU). The neural processing unit may be a processor specialized in processing an artificial intelligence model, and the artificial intelligence model may be generated through machine learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more thereof, but is not limited thereto. Additionally, or alternatively, the artificial intelligence model may include a software structure in addition to the hardware structure. At least two of the processing units and the processors described above may be implemented as one integrated component (e.g., a single chip) or may be implemented as independent components (e.g., a plurality of chips).

The circuit board CF may be bent on the rear surface of the display layer 100. That is, the lower surface of the display layer 100 and the lower surface of the circuit board CF may be located to face each other.

Figure 6:
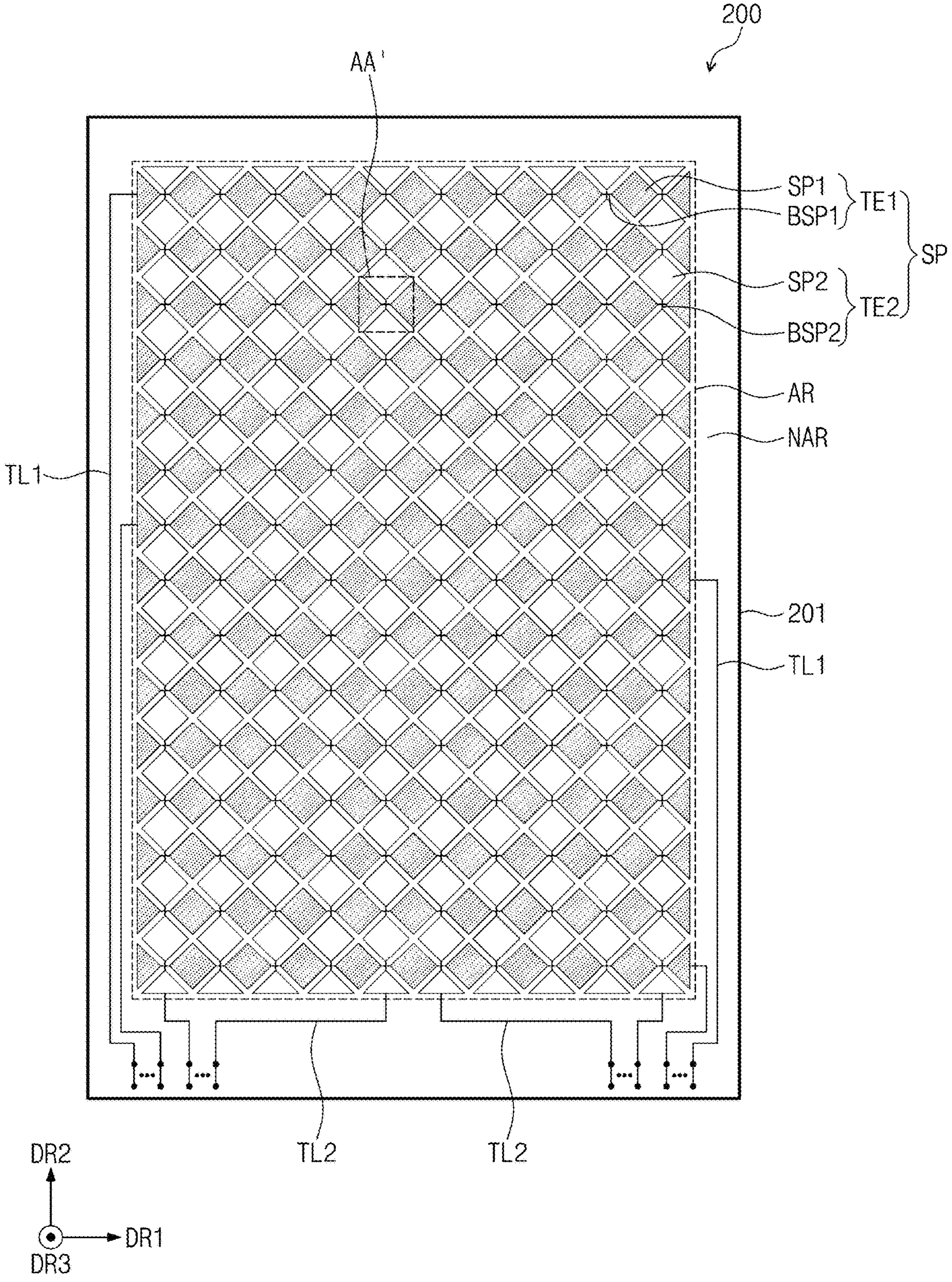
FIG. 6 is a plan view of a sensor layer according to one or more embodiments of the present disclosure.

FIG. 6 is a plan view of the sensor layer according to one or more embodiments of the present disclosure.

Referring to FIGS. 5 and 6, the sensor layer 200 may include an active area AR, and a peripheral area NAR adjacent to the active area AR. The active area AR may be an area activated depending on an electrical signal. The active area AR may be an area that senses an input. The active area AR may overlap the display area DP-DA of the display layer 100. The peripheral area NAR may overlap the peripheral area DP-NDA of the display layer 100.

The sensor layer 200 may include a plurality of sensing electrodes SP and a plurality of sensing lines TL1 and TL2. A plurality of first electrodes TE1 and a plurality of second electrodes TE2 may be located in the active area AR, and the plurality of sensing lines TL1 and TL2 may be located in the peripheral area NAR.

The base layer 201 may be an inorganic layer including one of silicon nitride, silicon oxy nitride, and silicon oxide. Alternatively, the base layer 201 may be an organic layer including an epoxy resin, an acrylic resin, or an imide-based resin. The base layer 201 may be directly formed on the display layer 100. Alternatively, the base layer 201 may be coupled with the display layer 100 through an adhesive member.

The plurality of sensing electrodes SP may include the plurality of first electrodes TE1 and the plurality of second electrodes TE2. The sensor layer 200 may obtain information about an external input through a change in the capacitance between the plurality of first electrodes TE1 and the plurality of second electrodes TE2. The plurality of first electrodes TE1 and the plurality of second electrodes TE2 may be insulated from each other, and may cross each other.

Each of the plurality of first electrodes TE1 may extend in the first direction DR1, and the plurality of first electrodes TE1 may be arranged in the second direction DR2. Each of the plurality of first electrodes TE1 may include a plurality of sensing patterns SP1 and a plurality of bridge patterns BSP1. Each of the plurality of bridge patterns BSP1 may electrically connect two sensing patterns SP1 that are adjacent to each other. The plurality of sensing patterns SP1 may be referred to as a plurality of first sensing parts SP1. The plurality of bridge patterns BSP1 may be referred to as a plurality of first connecting parts BSP1.

The sensor driver 200C may sequentially output the touch transmission signal TX to the plurality of first electrodes TE1.

Each of the plurality of second electrodes TE2 may extend in the second direction DR2, and the plurality of second electrodes TE2 may be arranged in the first direction DR1. Each of the plurality of second electrodes TE2 may include a plurality of first parts SP2 and a plurality of second parts BSP2. Each of the plurality of second parts BSP2 may electrically connect two first parts SP2 adjacent to each other. The plurality of first parts SP2 may be referred to as a plurality of second sensing parts SP2. The plurality of second parts BSP2 may be referred to as a plurality of second connecting parts BSP2.

The plurality of bridge patterns BSP1 may be located on a layer that is different from the layer on which the plurality of second parts BSP2 are located. The plurality of bridge patterns BSP1 may be insulated from the plurality of second electrodes TE2, and may cross the plurality of second electrodes TE2. For example, the plurality of bridge patterns BSP1 may be insulated from the plurality of second parts BSP2, and may cross the plurality of second parts BSP2.

The sensor driver 200C may receive the touch reception signal RX from the plurality of second electrodes TE2. The sensor driver 200C may calculate coordinate information of an input based on the touch reception signal RX received from the sensor layer 200, and may provide a coordinate signal having the coordinate information to the main driver 1000C. The touch reception signal RX may include information about a change in the capacitance between the plurality of first electrodes TE1 and the plurality of second electrodes TE2.

The plurality of sensing lines TL1 and TL2 may include a plurality of first sensing lines TL1 and a plurality of second sensing lines TL2. The plurality of first sensing lines TL1 may be electrically connected to the plurality of first electrodes TE1, respectively. The plurality of second sensing lines TL2 may be electrically connected to the plurality of second electrodes TE2, respectively.

The plurality of first sensing lines TL1 may be electrically connected to the plurality of first sensing pads TD1 through contact holes, respectively. The plurality of second sensing lines TL2 may be electrically connected to the plurality of second sensing pads TD2 through contact holes, respectively.

Figure 7:
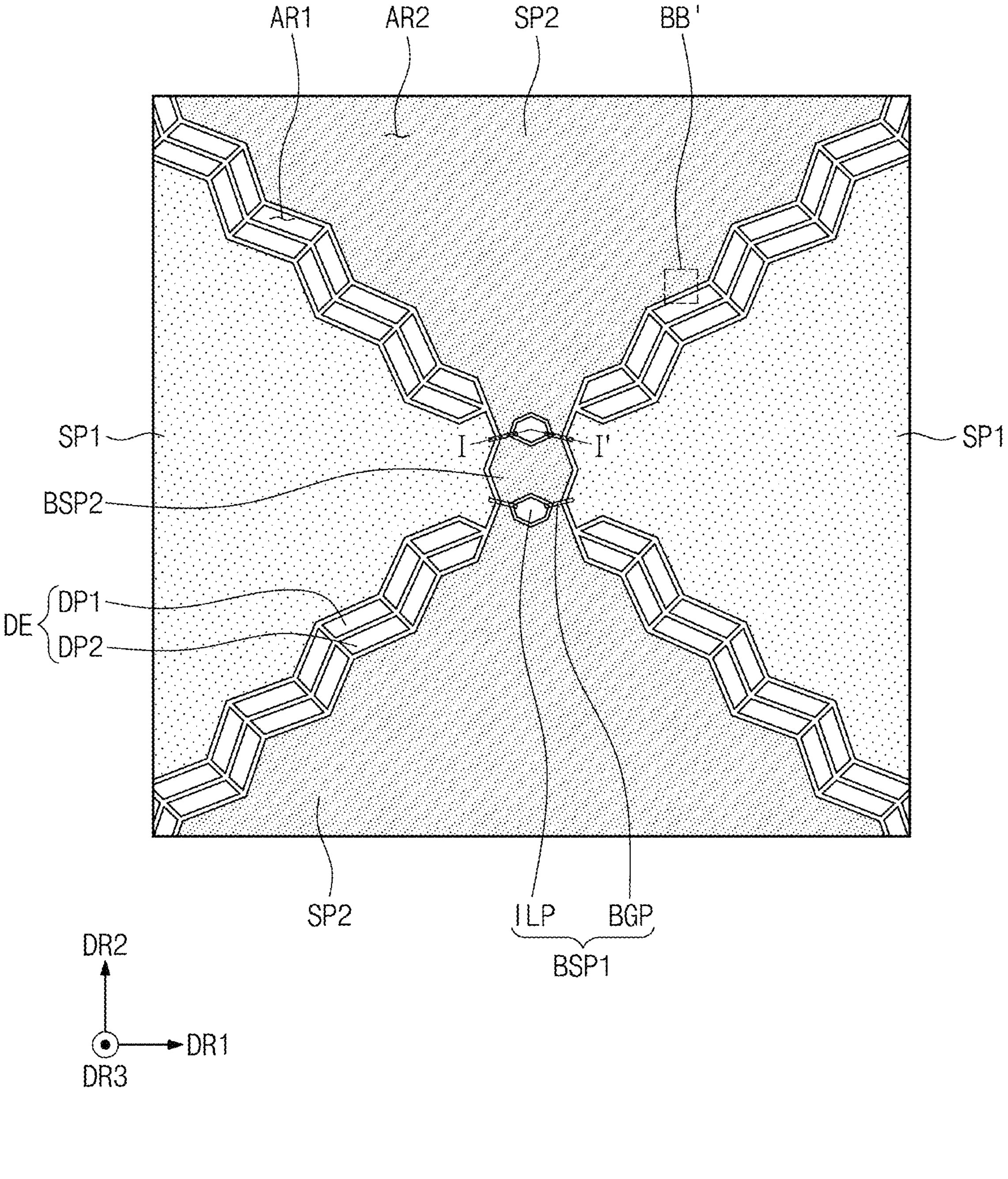
FIG. 7 is an enlarged plan view illustrating area AA' of FIG. 6 according to one or more embodiments of the present disclosure.
Figure 8:
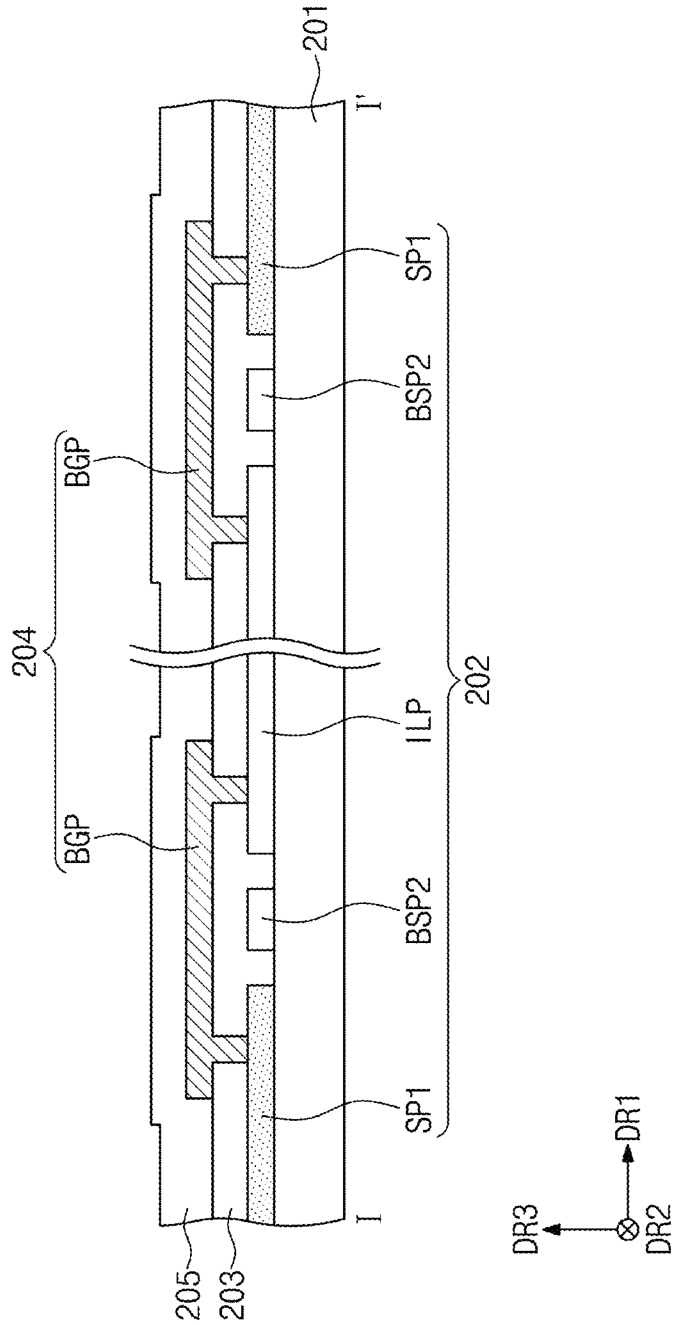
FIG. 8 is a sectional view taken along the line I-I' illustrated in FIG. 7 according to one or more embodiments of the present disclosure.

FIG. 7 is an enlarged plan view illustrating area AA' of FIG. 6 according to one or more embodiments of the present disclosure. FIG. 8 is a sectional view taken along the line I-I' illustrated in FIG. 7 according to one or more embodiments of the present disclosure.

Referring to FIGS. 7 and 8, the sensor layer 200 may include the plurality of sensing patterns SP1, the bridge pattern BSP1, the plurality of first parts SP2, the second part BSP2, and a dummy electrode DE.

The bridge pattern BSP1 may be electrically connected with at least two adjacent sensing patterns SP1.

The second part BSP2 may be electrically connected with at least two adjacent first parts SP2.

The dummy electrode DE may be located between the plurality of sensing patterns SP1 and the plurality of first parts SP2. The dummy electrode DE may be formed through the same process as the plurality of sensing patterns SP1 and the plurality of first parts SP2. Accordingly, the dummy electrode DE may include the same material as the plurality of sensing patterns SP1 and the plurality of first parts SP2, and may have the same stack structure as the plurality of sensing patterns SP1 and the plurality of first parts SP2. The dummy electrode DE may be floated. The dummy electrode DE may be electrically insulated from the plurality of sensing patterns SP1 and the plurality of first parts SP2. Because of the dummy electrode DE, the likelihood of a phenomenon in which the boundary areas between the plurality of sensing patterns SP1 and the plurality of first parts SP2 are visible to the user may be reduced, prevented, or eliminated.

The dummy electrode DE may include a plurality of dummy patterns DP1 and DP2. The plurality of dummy patterns DP1 and DP2 may be insulated from each other. Each of the plurality of dummy patterns DP1 and DP2 may have a first area AR1.

Each of the plurality of first parts SP2 may have a second area AR2.

The first area AR1 of each of the plurality of dummy patterns DP1 and DP2 may be smaller than the second area AR2 of each of the plurality of first parts SP2. The first area AR1 of each of the plurality of dummy patterns DP1 and DP2 may be defined based on the second area AR2 of each of the plurality of first parts SP2. The ratio of the first area AR1 of each of the plurality of dummy patterns DP1 and DP2 to the second area AR2 of each of the plurality of first parts SP2 may satisfy the ratio range described in FIG. 3. For example, the first area AR1 of each of the plurality of dummy patterns DP1 and DP2 may range from about 1% to about 10% of the second area AR2 of each of the plurality of first parts SP2. Description thereabout will be given below.

The plurality of dummy patterns DP1 and DP2 may include the first dummy pattern DP1 and the second dummy pattern DP2. The first dummy pattern DP1 may be adjacent to one of the plurality of sensing patterns SP1. The second dummy pattern DP2 may be adjacent to one of the plurality of first parts SP2.

The shape of the first dummy pattern DP1 may be different from the shape of the second dummy pattern DP2. However, the shapes of the plurality of dummy patterns DP1 and DP2 according to one or more embodiments of the present disclosure are not limited thereto. For example, the plurality of dummy patterns DP1 and DP2 may have the same shape.

Each of the plurality of bridge patterns BSP1 may include at least one island pattern ILP and/or a plurality of connecting patterns BGP.

The island pattern ILP may be adjacent to the second part BSP2. The island pattern ILP may have a hexagonal shape. However, the island pattern ILP according to one or more embodiments of the present disclosure may have various shapes.

The connecting patterns BGP may be connected between the sensing patterns SP1 and the island pattern ILP.

The first conductive layer 202 may include the plurality of sensing patterns SP1, the plurality of first parts SP2, the plurality of second parts BSP2, and the island pattern ILP. The plurality of sensing patterns SP1, the plurality of first parts SP2, the plurality of second parts BSP2, and the island pattern ILP may be located on the base layer 201.

The sensing insulation layer 203 may cover the plurality of sensing patterns SP1, the plurality of first parts SP2, the plurality of second parts BSP2, and the island pattern ILP.

The second conductive layer 204 may include the connecting patterns BGP. The connecting patterns BGP may be located on the sensing insulation layer 203. The connecting patterns BGP may be located on a layer that is different from the layer on which the sensing patterns SP1 and the island pattern ILP are located. The cover insulating layer 205 may cover the connecting patterns BGP.

Although FIG. 8 illustrates an example that the sensor layer 200 has a top bridge structure, the stack structure of the sensor layer 200 according to one or more embodiments of the present disclosure is not limited thereto. For example, the sensor layer 200 may have a bottom bridge structure.

Figure 9A:
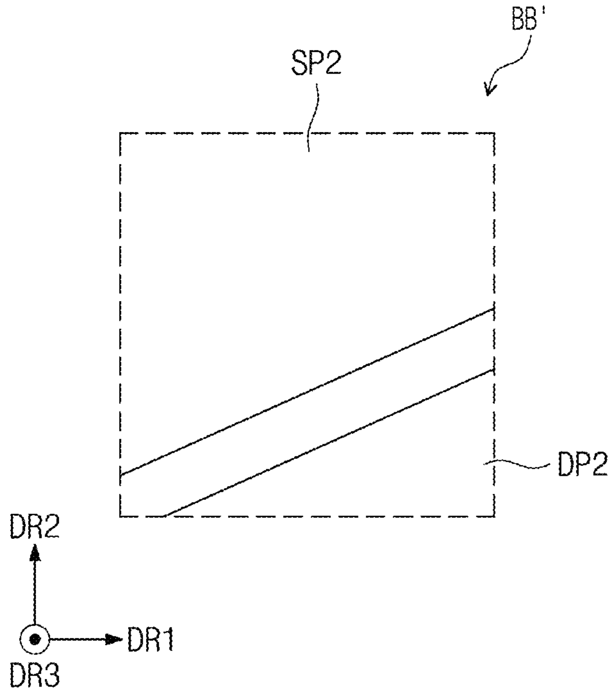
FIG. 9A is an enlarged plan view illustrating area BB' of FIG. 7 according to one or more embodiments of the present disclosure.
Figure 9B:
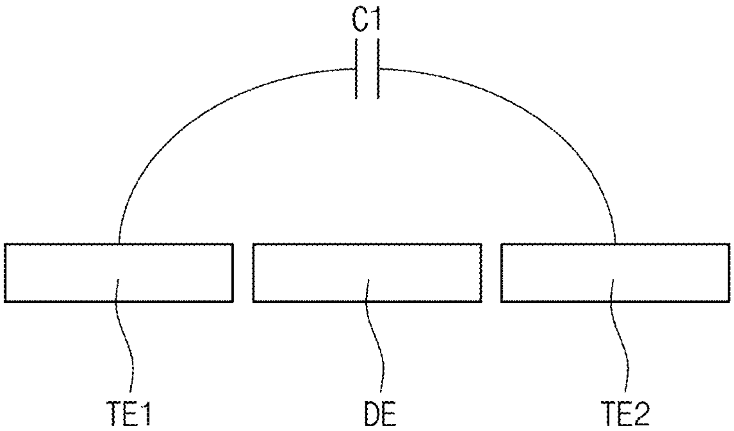
FIG. 9B is a view for explaining mutual capacitance between a first electrode and a second electrode according to one or more embodiments of the present disclosure.

FIG. 9A is an enlarged plan view illustrating area BB' of FIG. 7 according to one or more embodiments of the present disclosure. FIG. 9B is a view for explaining mutual capacitance between the first electrode and the second electrode according to one or more embodiments of the present disclosure.

Referring to FIGS. 3, 9A, and 9B, the first part SP2 and the second dummy pattern DP2 may be spaced apart from each other. The first part SP2 and the second dummy pattern DP2 may be electrically insulated from each other. The first area of the second dummy pattern DP2 may range from about 1% to about 10% of the second area of the first part SP2.

The dummy electrode DE including the second dummy pattern DP2 may be located between the first electrode TE1 and the second electrode TE2.

A first capacitor C1 having a first capacitance may be defined between the first electrode TE1 and the second electrode TE2.

The sensor driver 200C may calculate the coordinates of the first input 2000, based on the first capacitance of the first capacitor C1.

Figure 10A:
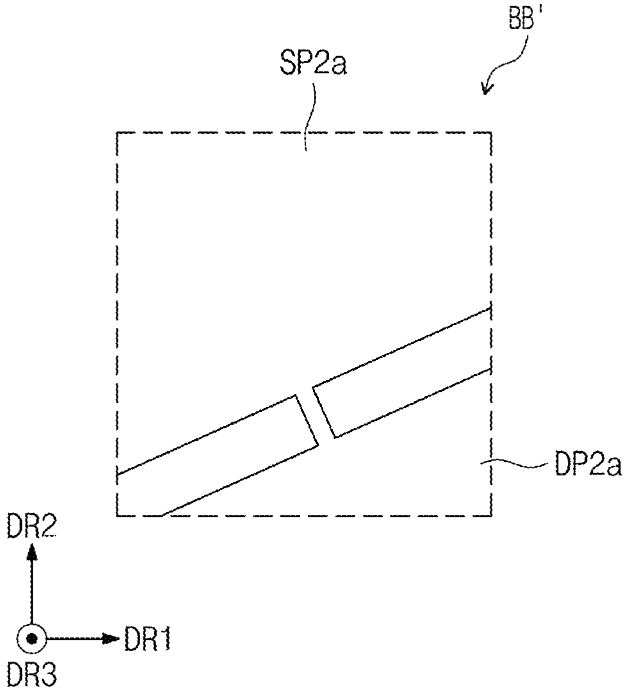
FIG. 10A is an enlarged plan view illustrating an area corresponding to area BB' of FIG. 7 according to one or more embodiments of the present disclosure.
Figure 10B:
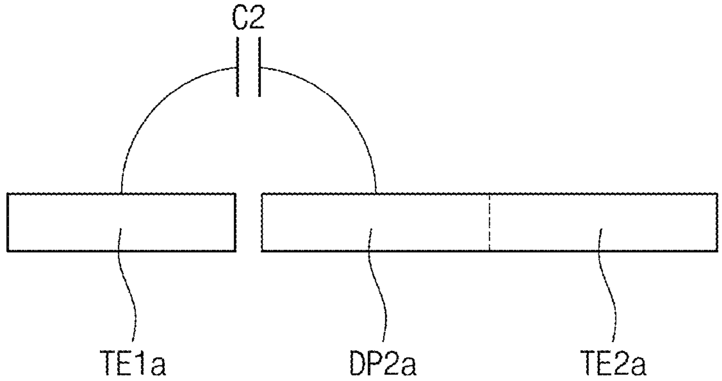
FIG. 10B is a view for explaining mutual capacitance between a first electrode and a second electrode according to one or more embodiments of the present disclosure.

FIG. 10A is an enlarged plan view illustrating an area corresponding to area BB' of FIG. 7 according to one or more embodiments of the present disclosure. FIG. 10B is a view for explaining mutual capacitance between a first electrode and a second electrode according to one or more embodiments of the present disclosure.

Referring to FIGS. 3 and 9A to 10B, a short circuit may occur between a portion of a first part SP2*a* and a portion of a second dummy pattern DP2*a* due to external physical impact, electrostatic discharge (ESD), or the like, and therefore the first part SP2*a* and the second dummy pattern DP2*a* may be connected with each other.

Because the remaining dummy patterns of the dummy electrode DE (refer to FIG. 7) are electrically insulated from the second dummy pattern DP2*a*, the remaining dummy patterns of the dummy electrode DE may not be electrically connected with the first part SP2*a*.

A second capacitor C2 having a second capacitance may be defined between the first electrode TE1*a*, the second electrode TE2*a*, and/or the second dummy pattern DP2*a*.

Because the first part SP2*a* and the second dummy pattern DP2*a* are electrically connected, the area of the second electrode TE2*a* may be increased, and the distance between the first electrode TE1*a* and the second electrode TE2*a* may be decreased. Accordingly, the second capacitance of the second capacitor C2 may be increased.

The first area of the second dummy pattern DP2*a* may range from about 1% to about 10% of the second area of the first part SP2*a*. Due to this, when compared to the first capacitance of the first capacitor C1 (refer to FIG. 9B), the second capacitance may have an increase rate of about 1% to about 10%.

When the first area of the second dummy pattern DP2*a* is less than about 1% of the second area of the first part SP2*a* unlike in the present disclosure, the area of the dummy electrode DE may be relatively small, and therefore the first electrode TE1 and the second electrode TE2 may not be sufficiently spaced apart from each other. In this case, when the short circuit occurs, the first electrode TE1 and the second electrode TE2 may be electrically connected so that the sensor layer 200 may not function. In addition, when the first area of the second dummy pattern DP2*a* exceeds about 10% of the second area of the first part SP2*a*, the increase rate of the second capacitance relative to the first capacitance may exceed the ratio range, and the sensor driver 200C may operate in the second mode. Accordingly, the sensor driver 200C may unintentionally operate, and therefore reliability may be reduced.

However, according to the present disclosure, the first area of each of the plurality of dummy patterns DP2 and DP2*a* included in the dummy electrode DE (refer to FIG. 7) may range from about 1% to about 10% of the second area of each of the first parts SP2 and SP2*a*. Even though a short circuit occurs between the first part SP2*a* and the second dummy pattern DP2*a* due to an external force, the increase rate of the area of the first part SP2*a* may range from about 1% to about 10%. That is, the sensor driver 200C may not operate in the second mode. Accordingly, the likelihood of unintentional mode switching may be reduced or prevented. Thus, the electronic device 1000 with improved reliability may be provided.

Figure 11:
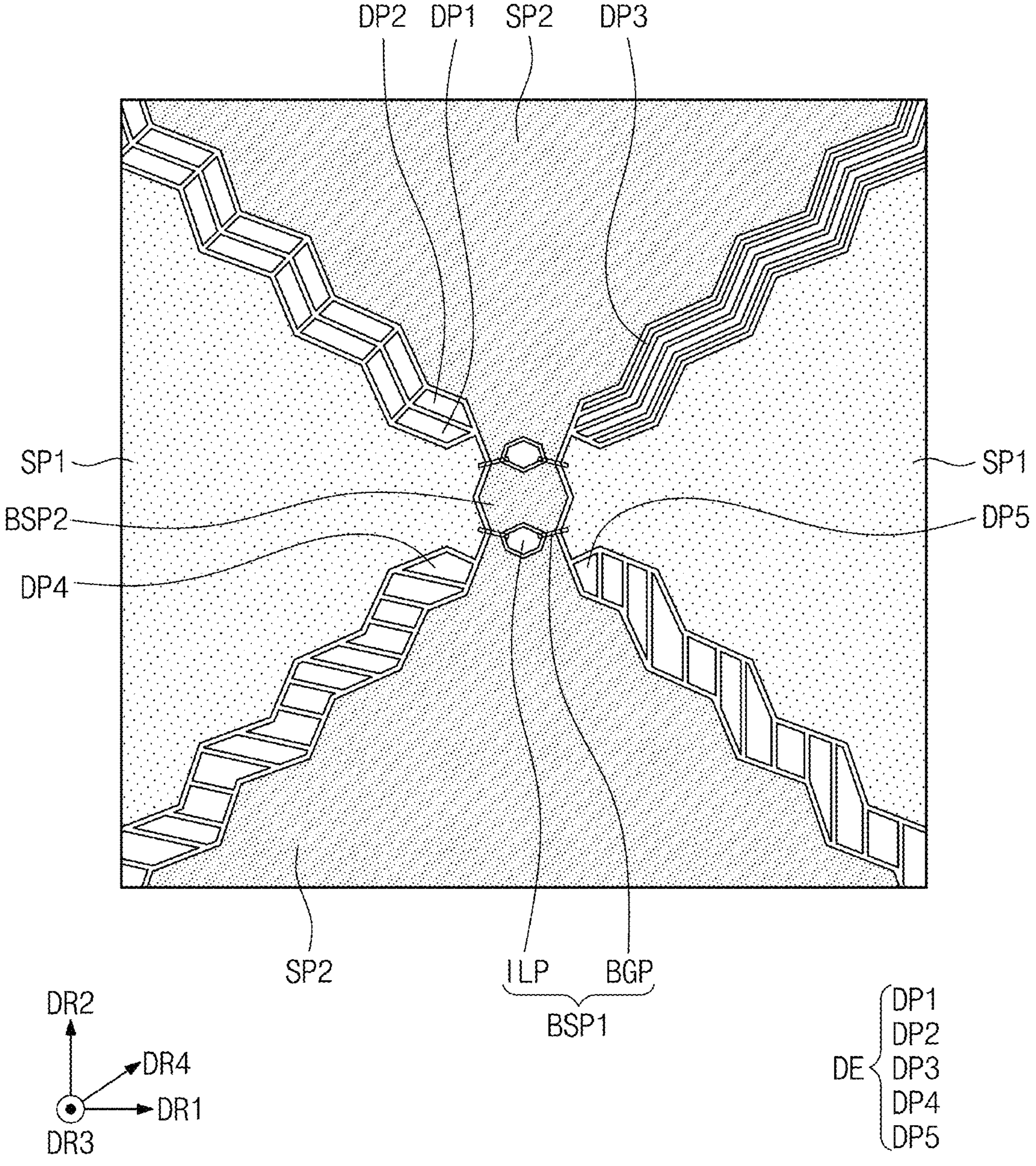
FIG. 11 is an enlarged plan view illustrating an area corresponding to area AA' of FIG. 6 according to one or more embodiments of the present disclosure.

FIG. 11 is an enlarged plan view illustrating an area corresponding to area AA' of FIG. 6 according to one or more embodiments of the present disclosure. In describing FIG. 11, the components described with reference to FIG. 7 will be assigned with the identical reference numerals, and repeated descriptions thereabout will be omitted.

Referring to FIG. 11, the dummy electrode DE may include a plurality of dummy patterns DP1, DP2, DP3, DP4, and DP5.

The plurality of dummy patterns DP1 to DP5 may include the first dummy pattern DP1, the second dummy pattern DP2, the third dummy pattern DP3, the fourth dummy pattern DP4, and/or the fifth dummy pattern DP5.

The plurality of dummy patterns DP1 to DP5 may have different areas. The ratio of the first area of each of the plurality of dummy patterns DP1 to DP5 to the second area of each of the plurality of first parts SP2 may satisfy the ratio range described in FIG. 3. For example, the first area of each of the plurality of dummy patterns DP1 to DP5 may range from about 1% to about 10% of the second area of each of the plurality of first parts SP2.

The plurality of dummy patterns DP1 to DP5 may have different shapes. The first dummy pattern DP1 and the second dummy pattern DP2 may be adjacent to each other.

The third dummy pattern DP3 may have a shape extending in a fourth direction DR4 crossing the first direction DR1 and the second direction DR2.

The fourth dummy pattern DP4 may have a shape in which the dummy electrode DE is divided by a cutting line extending in the first direction DR1.

The fifth dummy pattern DP5 may have a shape in which the dummy electrode DE is divided by a cutting line extending in the second direction DR2.

Figure 12:
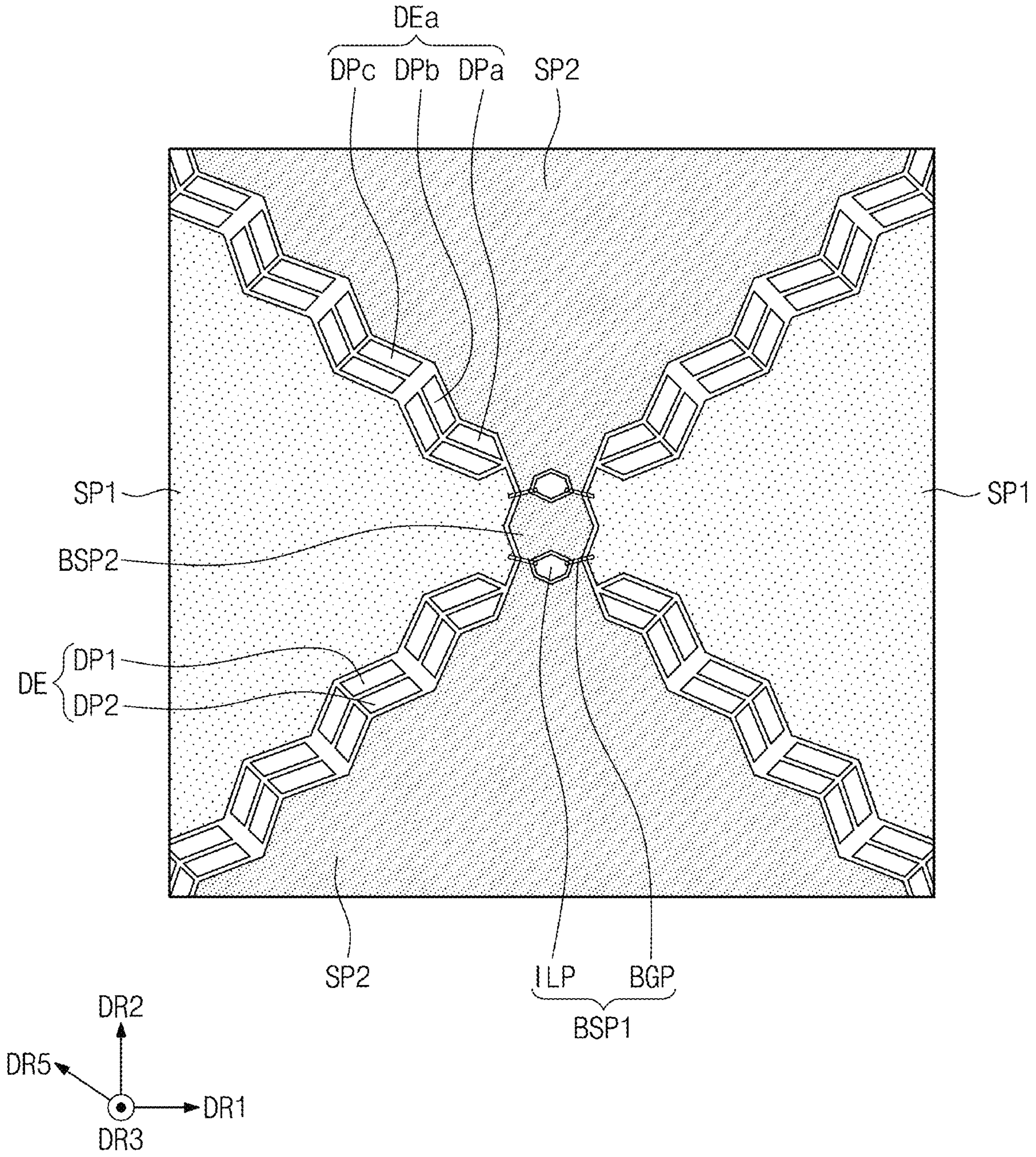
FIG. 12 is an enlarged plan view illustrating an area corresponding to area AA' of FIG. 6 according to one or more embodiments of the present disclosure.

FIG. 12 is an enlarged plan view illustrating an area corresponding to area AA' of FIG. 6 according to one or more embodiments of the present disclosure. In describing FIG. 12, the components described with reference to FIG. 7 will be assigned with the identical reference numerals, and repeated descriptions thereabout will be omitted.

Referring to FIG. 12, a dummy electrode DEa may include a plurality of dummy patterns DPa, DPb, and DPc.

The plurality of dummy patterns DPa, DPb, and DPc may include the first dummy pattern DPa, the second dummy pattern DPb, and the third dummy pattern DPc. The first dummy pattern DPa, the second dummy pattern DPb, and the third dummy pattern DPc may be adjacent to one another. The first dummy pattern DPa, the second dummy pattern DPb, and the third dummy pattern DPc may be sequentially located in a fifth direction DR5 that crosses the direction opposite to the first direction DR1 and the second direction DR2.

The ratio of the first area of each of the plurality of dummy patterns DPa, DPb, and DPc to the second area of each of the plurality of first parts SP2 may satisfy the ratio range described in FIG. 3. For example, the first area of each of the plurality of dummy patterns DPa, DPb, and DPc may range from about 1% to about 10% of the second area of each of the plurality of first parts SP2.

The gaps between the plurality of dummy patterns DPa, DPb, and DPc may be different from each other. The gap between the first dummy pattern DPa and the second dummy pattern DPb may be different from the gap between the second dummy pattern DPb and the third dummy pattern DPc.

As described above, the ratio of the first area of each of the plurality of dummy patterns to the second area of each of the plurality of first parts may satisfy the ratio range. For example, the first area of each of the plurality of dummy patterns included in the dummy electrode may range from about 1% to about 10% of the second area of the first part. Even though a short circuit occurs between the first part and the second dummy pattern due to an external force, the increase rate of the area of the first part may range from about 1% to about 10%. That is, even though the short circuit occurs, the sensor driver may not operate in a corresponding mode when the mutual capacitance of a corresponding node of the sensor layer is outside the ratio range (e.g., predetermined ratio range) when compared to that of another node adjacent to the corresponding node. Accordingly, the likelihood of unintentional mode switching may be reduced or prevented. Thus, the electronic device with improved reliability may be provided.

While the present disclosure has been described with reference to embodiments thereof, it will be apparent to those of ordinary skill in the art that various changes and modifications may be made thereto without departing from the spirit and scope of the present disclosure as set forth in the following claims, with functional equivalents thereof to be included therein.

What is claimed is:

1. An electronic device comprising: a display layer; a sensor layer above the display layer; and a sensor driver configured to drive the sensor layer in a first mode when an increase rate of a mutual capacitance of a node of the sensor layer compared to a mutual capacitance of another node that is adjacent to the node is outside a ratio range, wherein the sensor layer comprises: a first electrode comprising sensing patterns and a bridge pattern; a second electrode comprising first parts and a second part; and a dummy electrode comprising dummy patterns, wherein a first area of one of the dummy patterns is less than a second area of one of the first parts, and wherein a ratio of the first area to the second area satisfies the ratio range.

2. The electronic device of claim 1, wherein the ratio range ranges from about 1% to about 10%.

3. The electronic device of claim 1, wherein the first electrode extends in a first direction, wherein the second electrode extends in a second direction crossing the first direction, and wherein the first electrode and the second electrode are insulated from each other, and cross each other.

4. The electronic device of claim 1, wherein the dummy patterns are between a first part of the first parts and a sensing pattern of the sensing patterns.

5. The electronic device of claim 1, wherein the dummy patterns are electrically insulated from each other.

6. The electronic device of claim 1, wherein a first part of the first parts, the second part, and a sensing pattern of the sensing patterns are at a same layer.

7. The electronic device of claim 6, wherein the bridge pattern comprises:

an island pattern adjacent to the second part; and a connecting pattern connected between the sensing pattern and the island pattern, and at a layer that is different from a layer of the sensing pattern and the island pattern.

8. The electronic device of claim 1, wherein a first capacitor having a first capacitance is defined between the first electrode and the second electrode, wherein the second electrode and one of the dummy patterns are electrically connected, wherein a second capacitor having a second capacitance is defined between the first electrode, and the second electrode and the one of the dummy patterns, and wherein the second capacitance has an increase rate of about 1% to about 10% when compared to the first capacitance.

9. The electronic device of claim 1, wherein the dummy patterns comprise a first dummy pattern and a second dummy pattern having different respective areas.

10. The electronic device of claim 1, wherein the dummy patterns comprise a first dummy pattern and a second dummy pattern having different respective shapes.

11. The electronic device of claim 1, wherein the dummy patterns comprise a first dummy pattern, a second dummy pattern, and a third dummy pattern, and wherein a width of a gap between the first dummy pattern and the second dummy pattern is different from a width of a gap between the second dummy pattern and the third dummy pattern.

12. An electronic device comprising: a display layer; a sensor driver configured to drive a sensor layer in a first mode when an increase rate of a mutual capacitance of a node of the sensor layer compared to a mutual capacitance of another node that is adjacent to the node is outside a ratio range; and the sensor layer above the display layer, and comprising: a first electrode comprising sensing patterns and a bridge pattern; a second electrode comprising first parts and a second part; and a dummy electrode comprising dummy patterns, and wherein a first area of one of the dummy patterns ranges from about 1% to about 10% of a second area of one of the first parts; and wherein the bridge pattern comprises an island pattern between adjacent ones of the sensing patterns in plan view, and a connecting pattern between the island pattern and at least one of the sensing patterns in plan view.

13. The electronic device of claim 12, wherein the first electrode extends in a first direction, wherein the second electrode extends in a second direction crossing the first direction, and wherein the first electrode and the second electrode are insulated from each other, and cross each other.

14. The electronic device of claim 12, wherein the dummy patterns are between a first part of the first parts and a sensing pattern of the sensing patterns.

15. The electronic device of claim 12, wherein the dummy patterns are electrically insulated from each other.

16. The electronic device of claim 12, wherein a first part of the first parts, the second part, and a sensing pattern of the sensing patterns are at a same layer.

17. The electronic device of claim 16, wherein the island pattern is adjacent to the second part, and wherein the connecting pattern is at a layer that is different from a layer of the sensing pattern and the island pattern.

18. The electronic device of claim 12, wherein a first capacitor having a first capacitance is defined between the first electrode and the second electrode, wherein the second electrode and one of the dummy patterns are electrically connected, wherein a second capacitor having a second capacitance is defined between the first electrode, and the second electrode and the one of the dummy patterns, and wherein the second capacitance has an increase rate of about 1% to about 10% when compared to the first capacitance.

19. The electronic device of claim 12, wherein the dummy patterns comprise a first dummy pattern and a second dummy pattern having different respective shapes.

20. The electronic device of claim 12, wherein the dummy patterns comprise a first dummy pattern and a second dummy pattern having different respective areas.

* * * * *